United States Patent [19]
Junqua

[11] Patent Number: 5,806,030
[45] Date of Patent: Sep. 8, 1998

[54] LOW COMPLEXITY, HIGH ACCURACY CLUSTERING METHOD FOR SPEECH RECOGNIZER

[76] Inventor: Jean-Claude Junqua, 146 Santa Ana Ave., Santa Barbara, Calif. 93111

[21] Appl. No.: 642,767

[22] Filed: May 6, 1996

[51] Int. Cl.$^6$ .................................................. G10L 5/00
[52] U.S. Cl. ..................... 704/245; 704/258; 704/240; 704/254; 704/255
[58] Field of Search ......................... 395/2.54, 2.65, 395/2.49, 2.63, 2.64, 2.53, 2.6, 2.61, 2.45

[56] References Cited

U.S. PATENT DOCUMENTS

| | | | |
|---|---|---|---|
| 4,783,804 | 11/1988 | Juang et al. | 395/2.54 |
| 4,803,729 | 2/1989 | Baker | 395/2.5 |
| 4,829,577 | 5/1989 | Kuroda et al. | 395/2.53 |
| 5,075,896 | 12/1991 | Wilcox et al. | 382/225 |
| 5,289,562 | 2/1994 | Mizuta et al. | 395/2.09 |
| 5,450,523 | 9/1995 | Zhao | 395/2.52 |
| 5,502,790 | 3/1996 | Yi | 395/2.65 |
| 5,598,507 | 1/1997 | Kimber et al. | 395/2.55 |

Primary Examiner—David R. Hudspeth
Assistant Examiner—Vijay B. Chawan
Attorney, Agent, or Firm—Harness, Dickey & Pierce, P.L.C.

[57] ABSTRACT

The clustering technique produces a low complexity and yet high accuracy speech representation for use with speech recognizers. The task database comprising the test speech to be modeled is segmented into subword units such as phonemes and labeled to indicate each phoneme in its left and right context (triphones). Hidden Markov Models are constructed for each context-independent phoneme and trained. Then the center states are tied for all phonemes of the same class. Triphones are trained and all poorly-trained models are eliminated by merging their training data with the nearest well-trained model using a weighted divergence computation to ascertain distance. Before merging, the threshold for each class is adjusted until the number of good models for each phoneme class is within predetermined upper and lower limits. Finally, if desired, the number of mixture components used to represent each model may be increased and the models retrained. This latter step increases the accuracy.

10 Claims, 6 Drawing Sheets

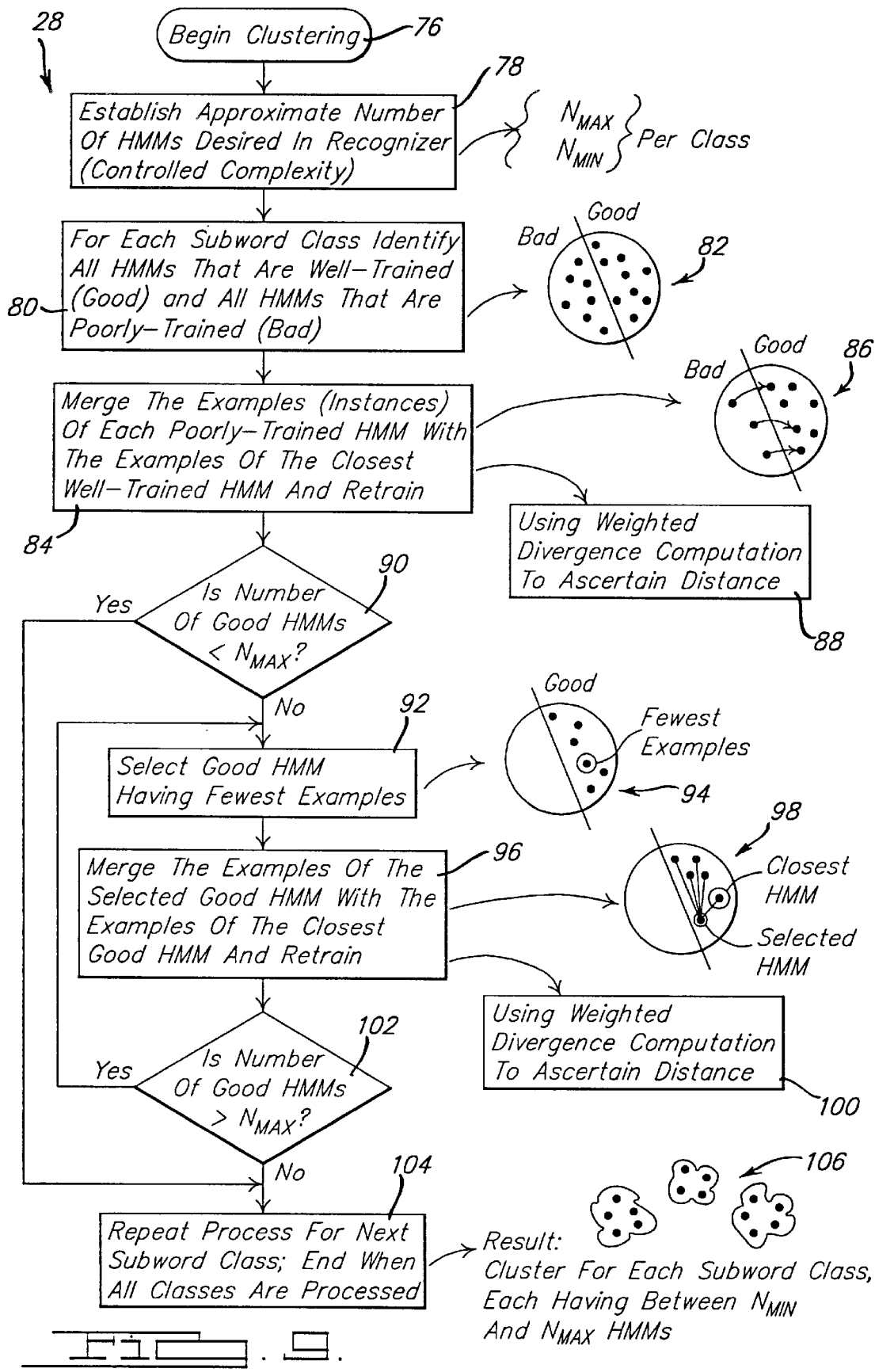

ns (a succession of three arpabet symbols) similar to those used in the pronunciation key of a dictionary.

LOW COMPLEXITY, HIGH ACCURACY CLUSTERING METHOD FOR SPEECH RECOGNIZER

BACKGROUND AND SUMMARY OF THE INVENTION

The present invention relates generally to continuous speech recognition. More particularly, the invention relates to a divergence clustering technique that achieves a low complexity and yet high accuracy speech model. The method allows the size (complexity) of the model set to be controlled before the models are built and the method ensures that each model is well trained.

Stochastic modeling forms the basis of a class of speech recognizers, in which speech is modeled statistically and the recognition process involves a decision-making process in which the average loss per decision is as small as possible. One such stochastic or statistical approach uses the Hidden Markov Model (HMM) as the basic topology for representing speech within the computer. Each speech utterance (such as each phoneme) is modeled as a sequence of separate states, with identified transitions between those states. To each state is associated a probability distribution of all possible output symbols—the symbols being represented by suitable labels. Specifically, each state is represented by a probability distribution representing the probability of producing a certain emission of speech frame or feature vector when a transition from this state occurs. In addition, each identified transition between states is represented as a probability of transition from that state to the other designated state.

In constructing a speech recognizer using a statistical model such as a Hidden Markov Model, it is customary to start with a definition of the topology. Specifically, the topology defines the number of HMM states that will be used to model each subword, which state-to-state transitions will be allowed and the number of Gaussian densities used to represent each state. There is a strong temporal constraint in speech, thus left to right HMMs are generally used. The number of Gaussian densities used per state affects the accuracy with which the model represents the actual speech data.

After the topology has been determined the model is then trained, using instances of actual speech for which the output symbols are known in advance. The model is trained to arrive at statistically determined parameters (e.g. mean and variance) based on the training data set. In this regard, the designer may select to use single Gaussian density representation for each state. However, to more accurately model a complex waveform often several Gaussian densities are combined, as a Gaussian mixture density, for a more accurate representation. In addition, each set of Gaussian parameters can be weighted. The decision to use Gaussian mixture densities in place of single Gaussian densities involves tradeoffs. Although more accurate, Gaussian mixture density models are considerably larger, requiring significantly greater memory allocation and processing cost.

As a pattern recognition problem, continuous speech recognition is very challenging. For one reason, phonemes are pronounced differently in different contexts. The preceding and following phonemes (neighboring phonemes) affect the sound of a given phoneme. For example, the "w" phoneme in the triphone "ow–w+ih" sounds different than the "w" in the triphone "ah–w+ah." In the preceding example, each triphone comprising three neighboring phonemes has been spelled using simplified multi-letter spell- To take into account that phonemes sound different in different contexts, a triphone model may be employed in the speech recognizer. However, this also greatly increases the complexity of the model. The American English sound system can be represented by 47 phonemes. Thus to model each phoneme in a triphone context, there are 47×47×47 (over 100,000) different triphone combinations that must be modeled. The phoneme "a" would require 47×47 (over 2,200) individual HMM models in such a triphone representation (assuming any sound can follow any other sound). Not only does this take a lot of storage space and computational processing power, but it is frequently difficult to train each of the models—the training database may not have enough examples of a given triphone combination to yield reliable results.

Currently there is a need to reduce the complexity in statistical models used for speech recognition. Ideally, complexity of the model should be accomplished in a way that minimally affects accuracy of the model. Clustering is a technique used to reduce model complexity.

There are various technqiues for clustering. Some of these techniques use examples or training data to compute the degree of closeness between models; other techniques do not. Some techniques compute the degree of closeness using the parameters of the Hidden Markov Model (e.g., mean and variance). Where there is no a priori knowledge upon which to base the clustering technique, the models may be clustered using statistical data representing their differences. However, such a statistical approach is completely blind—there is no effective way to verify that the clusters are reasonably built.

One form of clustering is described in D'Orta, Paolo et al., "Phoneme Classification for Real Time Speech Recognition of Italian," ICASSP-87, pp. 81–84. D'Orta describes a conventional clustering technique that employs statistical processing to simplify the HMM models. HMM models having similar parameters are grouped together into a cluster, with the cluster then being replaced by a single HMM model to represent all previous models grouped with that cluster. Cluster grouping is performed based on a distance calculation.

The problem with this clustering technique is that poorly trained (i.e. unreliable) models can be indiscriminately included along with the well-trained ones. This degrades reliability, and some resulting clusters may be too poorly trained to support more accurate mixture density models. Moreover, if clustering is repeatedly performed using such statistical processing, there is no guarantee that the small set ultimately achieved will give a good representation of all phonemes in all different contexts. Some phonemes may be well modeled, while others may be poorly modeled and the system designer has little or no control over this.

Another clustering technique is described in Wong, M. "Clustering Triphones by Phonological Mapping," ICSLP-94, pp. 1939–1942. This reference describes how phonologic knowledge can be used to cluster phonemes of the same class (i.e. cluster all "a's" together). This technique depends on a priori phonetic similarity and not on actual training data. Thus this technique depends on fixed a priori knowledge. However, it is difficult to describe what happens in speech with a set of rules.

The present invention overcomes some of the shortcomings of prior clustering techniques. The method of the invention yields a small set of HMMs (low complexity). The size of the set is controlled by the system designer before the models are built. However, unlike conventional statistical clustering, the method ensures that each HMM model is the result of adequate examples of training data, to ensure that each model is well trained. Because each of the models is well trained, Gaussian mixture densities can be used to represent the states of each model for improved accuracy. Contrast this with conventional statistical clustering, where use of higher order Gaussian mixture densities on poorly trained clusters will not improve accuracy: an accurate view of an inadequately trained model does not yield an adequately trained model.

The method for deriving clusters according to the invention is particularly useful for deriving clusters of subwords, such as phonemes. Although the present implementation concentrates on the subwords within a given word unit, the same techniques can be employed to modeling subwords across word boundaries.

By way of summary, the method involves these steps. First, the training data is labeled or segmented to identify the beginning and ending of all subwords. A label or token is associated with each. In the presently preferred embodiment the subwords are phonemes, modeled as triphones to include the left and right phoneme contexts.

Next, HMM models are constructed for all triphone combinations, with the center HMM state of all phonemes of the same class being tied. Thus, for example, all HMM models for the triphones of class "w" are constructed so that the center HMM state is common to all members of the class. After state tying the HMM parameters are recomputed.

Next, a clustering operation is performed by first determining the number of models desired in the end result. Then, on a class-by-class basis, the HMM models are marked or otherwise segregated into those that are sufficiently trained (good) and those that are insufficiently trained (bad). Sufficiency of training is dictated by the number of examples of the particular triphone as represented in the training data. Bad models are merged with the nearest good model and the resulting clusters are each retrained using all training data for that cluster, including any training data from the bad model. Thus although a poorly trained model does not have enough examples of training data to be considered reliable, the training data associated with that model is nevertheless used when training the new cluster to which that model has been assigned.

After all bad models have been eliminated, the remaining clusters are regrouped (based on closeness) and retrained through a series of iterations designed to achieve the desired number of clusters. Specifically, the clustering process is guided so that the final number of clusters in each class is restricted to be between a lower limit ($N_{min}$) and an upper limit ($N_{max}$).

Finally, after the desired number of models has been achieved through repeatedly performing the preceding steps, the number of mixture components may be increased. This will increase the accuracy of the model.

Unlike conventional clustering techniques, the present invention achieves a controlled model size while ensuring that each phoneme is represented by sufficient training data. This being the case, the number of mixture components can be readily increased, to increase accuracy of the model, with confidence that the increased accuracy models are still well trained.

For a more complete understanding of the invention, its objects and advantages, refer to the following specification and to the accompanying drawings.

BRIEF DESCRIPTION OF THE DRAWINGS

FIG. 6 is a flowchart diagram illustrating the Clustering step;

FIG. 9 is a flowchart diagram depicting an alternate embodiment of the clustering step.

DESCRIPTION OF THE PREFERRED EMBODIMENT

Figure 1:
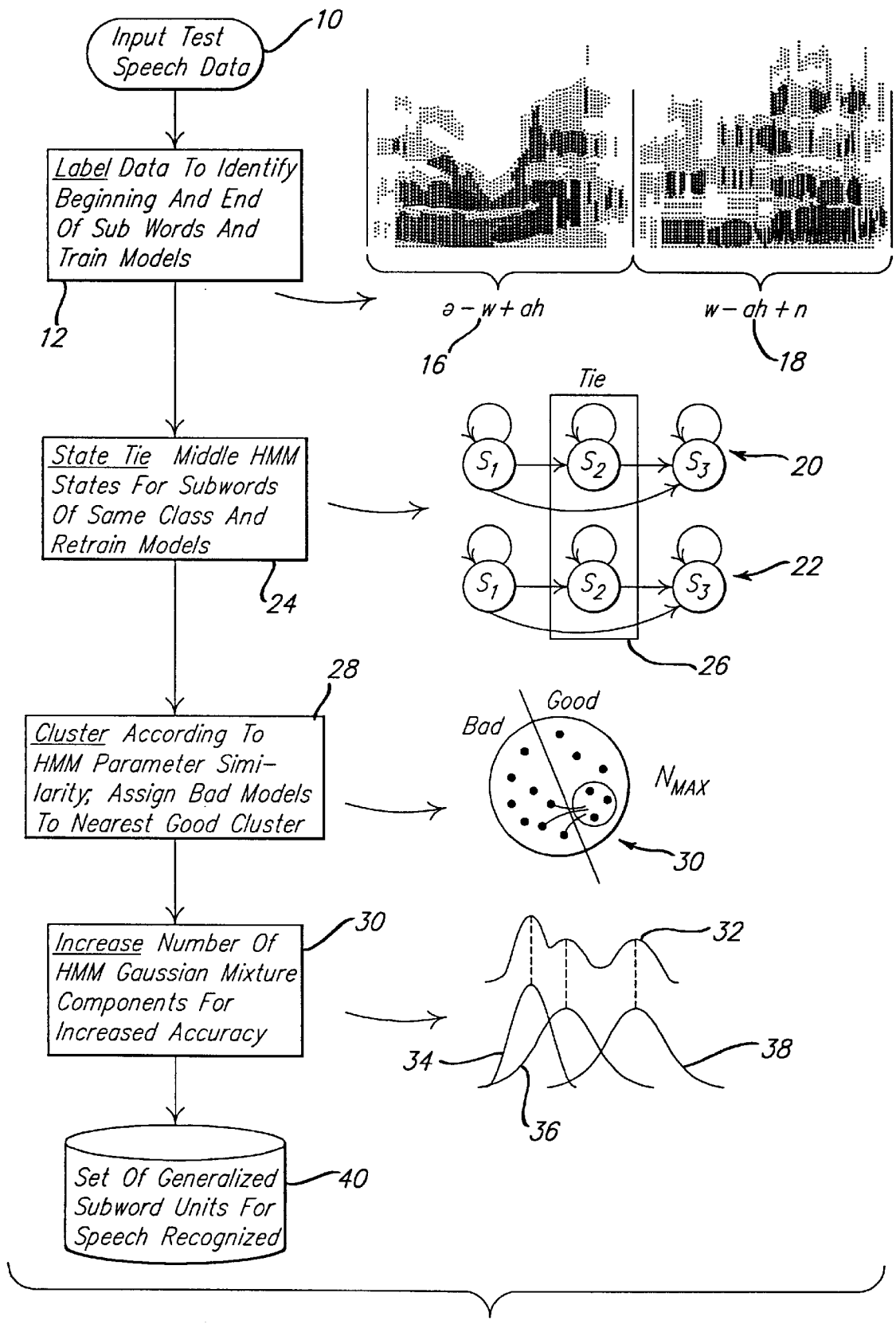
FIG. 1 is an overview of the method of the invention according to the presently preferred embodiment.

Referring to FIG. 1, an overview of the presently preferred method will be presented. In studying this overview, it should be kept in mind that the method constructs a well-trained, low complexity model that may be used in computer-implemented or machine-implemented speech recognizers. The technique for generating the model in accordance with the invention is, itself, a computer-implemented technique. In constructing the speech model (phoneme models) a training database is used. The presently preferred embodiment was constructed using the TIMIT database, representing some 3,696 carefully selected sentences for which all phonemes are labeled, with the beginning and ending of each noted. The TIMIT database is available from Linguistic Data Consortium LDC-9351. Although carefully constructed and painstakingly labeled by hand, the TIMIT database is still relatively small and does not contain enough examples of each phoneme in each different triphone context to ensure good training for the over 100,000 models. This shortcoming is solved by the present invention.

The first step in constructing the low complexity model is to process the input test speech data 10 by segmenting it into subword units according to neighboring unit context. In the presently preferred embodiment the subword units are phonemes and a triphone model is employed that reflects both left context and right context phoneme neighbors. Of course, the principles of the invention can be applied to other word or subword modeling topologies.

The first step of the method, depicted at step 12, is to label the training speech data to identify the beginning and ending of all subwords. This is depicted diagrammatically at 14, illustrating spectrograms of two allophones of phonemes "w" and "ah," in their respective triphone contexts. Note that the beginning and ending of each phoneme is identified and labeled. In FIG. 1 the beginning and ending of each phoneme is shown by braces each with an associated label 16 and 18. Taking label 18 as an example, the "ah" phoneme is described in a triphone context, the left context being "w" and the right context being "n."

The next step is to construct Hidden Markov Models for each of the subword units (phonemes). In the presently preferred embodiment a three-state Hidden Markov Model is adopted. This is not intended as a limitation of the invention, as suitable models containing a greater or fewer number of states could be employed. In FIG. 1 two three-state Hidden Markov Models have been depicted at 20 and 22 for illustration purposes. Given that American English can be represented by 47 phonemes, and given that each phoneme may have 47 left and 47 right contexts, the total number of models to represent all phonemes in triphone context exceeds 100,000 (47×47×47) assuming any sound can follow any other sound.

To reduce the number of parameters to estimate, the next step (Step 24) is to tie the middle HMM states for subwords of the same class. It is reasonable to do this because only the left and right sides of the phoneme may be influenced by coarticulation. This is depicted diagrammatically by the rectangle 26 in FIG. 1. Thus all center states of phoneme "w" are of the same class, regardless of right and left context.

Next, in Step 28 the models are clustered according to HMM similarity. As illustrated at 30, models are classified as either well trained (good) or poorly trained (bad) by comparing the number of training examples to a predetermined threshold. All models having training examples fewer than the threshold are classified as bad and all models having training examples greater than the threshold are classified as good. After this classification, all bad models are assigned to the nearest good model, thereby eliminating the bad models. If the number of models obtained after classification is not between predetermined lower and upper limits, $N_{min}$ and $N_{max}$, then the threshold is adjusted up or down to adjust the number of models before bad models are assigned to good models.

After clustering, the number of HMM Gaussian mixture components may be increased for greater accuracy (Step 30). To illustrate the concept diagrammatically, a complex probability distribution 32 is depicted as being modeled by a mixture of three Gaussian curves 34, 36 and 38.

The result is a set of generalized subword units in the form of a computer-readable or machine-readable database 40 that may be used for subsequent speech recognition.

Figure 2:
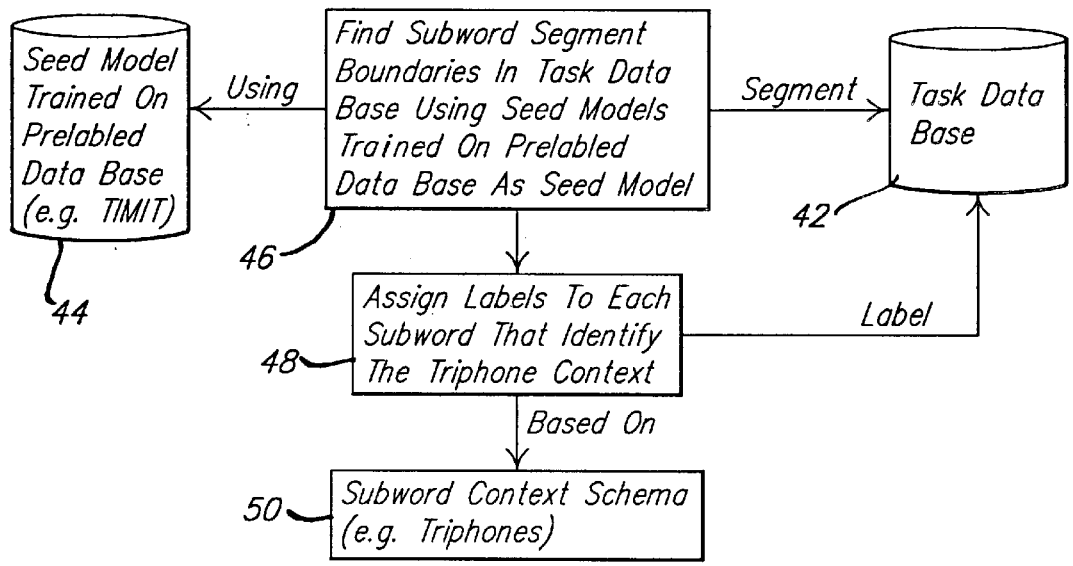
FIG. 2 is a flowchart further describing the Label Data step.

Turning to FIG. 2, the data labeling Step 12 is shown in detail. For purposes of illustrating the inventive techniques in the more general case, it will be assumed that the seed models are to be constructed from a database of prelabeled speech (prelabeled database) that may not necessarily be the same as that provided by the database to use during clustering (task database). Thus, in FIG. 2, the task database is depicted at 42 and the prelabeled database is depicted at 44. As previously discussed, the presently preferred embodiment was constructed using the TIMIT database that comprises numerous (but by no means complete) examples of speech already segmented and labeled.

The present invention segments and labels the task database 42 by finding subword segment boundaries in the task database using seed models obtained from the prelabeled database 44. This step is depicted at 46. After segmentation, each subword is assigned a label (Step 48) to identify each subword in its triphone context. Labeling is performed using a predetermined subword context schema (such as a triphone schema) depicted at 50. The result of Step 12 is a task database to which beginning and ending pointers and labels have been added.

Figure 3:
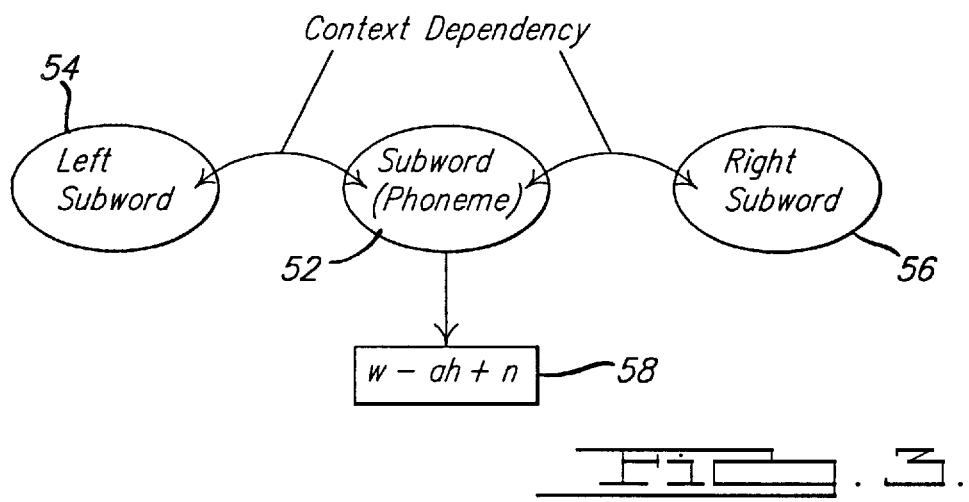
FIG. 3 is a diagram explaining the triphone concept.

By way of further illustration of the presently preferred triphone context schema, FIG. 3 shows an exemplary subword or phoneme 52 that is bounded by neighboring left subword 54 and right subword 56. In the corresponding label 58, the subword 52 is represented by the symbol "ah" and the left and right subwords 54 and 56 are represented by the symbols "w" and "n," respectively.

Figure 4:
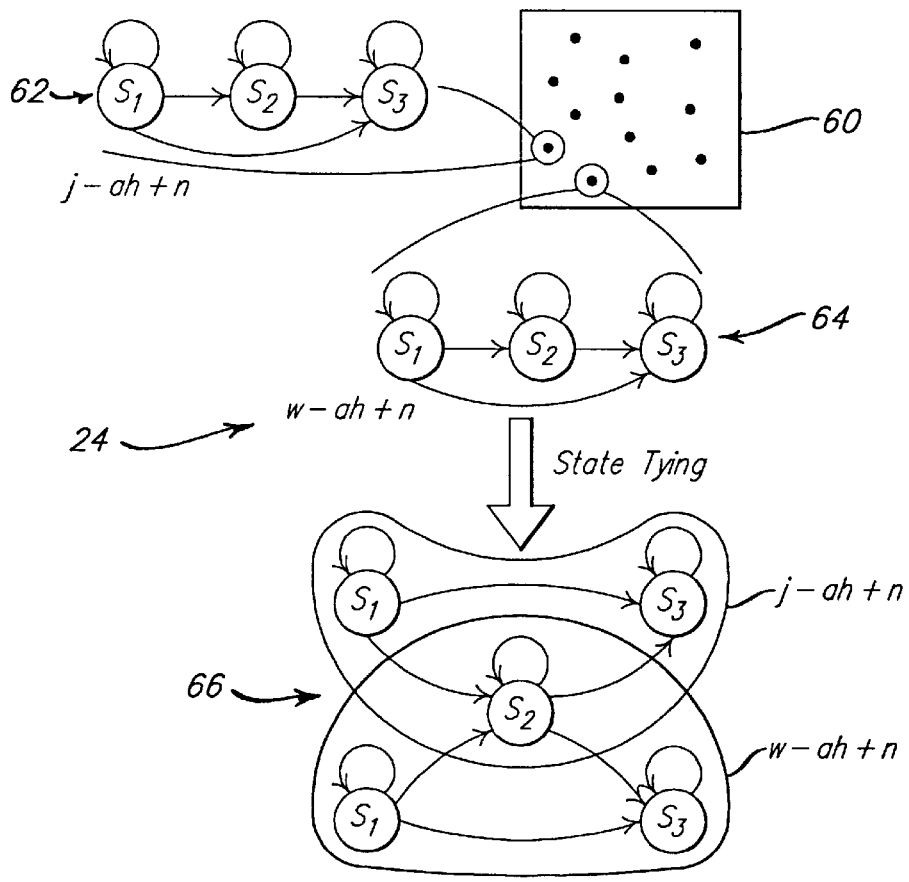
FIG. 4 is a state diagram illustrating the State Tying step.

After the task database has been segmented and labeled (Step 12) the context-independent phonemes are trained on this database. Then state tying is next performed (Step 24) as illustrated more fully in FIG. 4 and triphone models are trained. In FIG. 4 the individual models of a single class are represented as individual points within rectangle 60. Rectangle 60 thus represents all HMMs for phonemes of the same class. As illustrated at 62 and 64, each of the models comprises a plurality of Hidden Markov Model states according to the predefined topology. In FIG. 4 the Hidden Markov Model state diagrams have been illustrated for two contexts of the phoneme "ah," namely j–ah+n and w–ah+n.

State tying is performed by reconfiguring each of the models so that the center state $S_2$ is shared in common or "tied." Thus, as depicted at 66, the center state $S_2$ is tied for the two illustrated contexts j–ah+n and w–ah+n.

Figure 5:
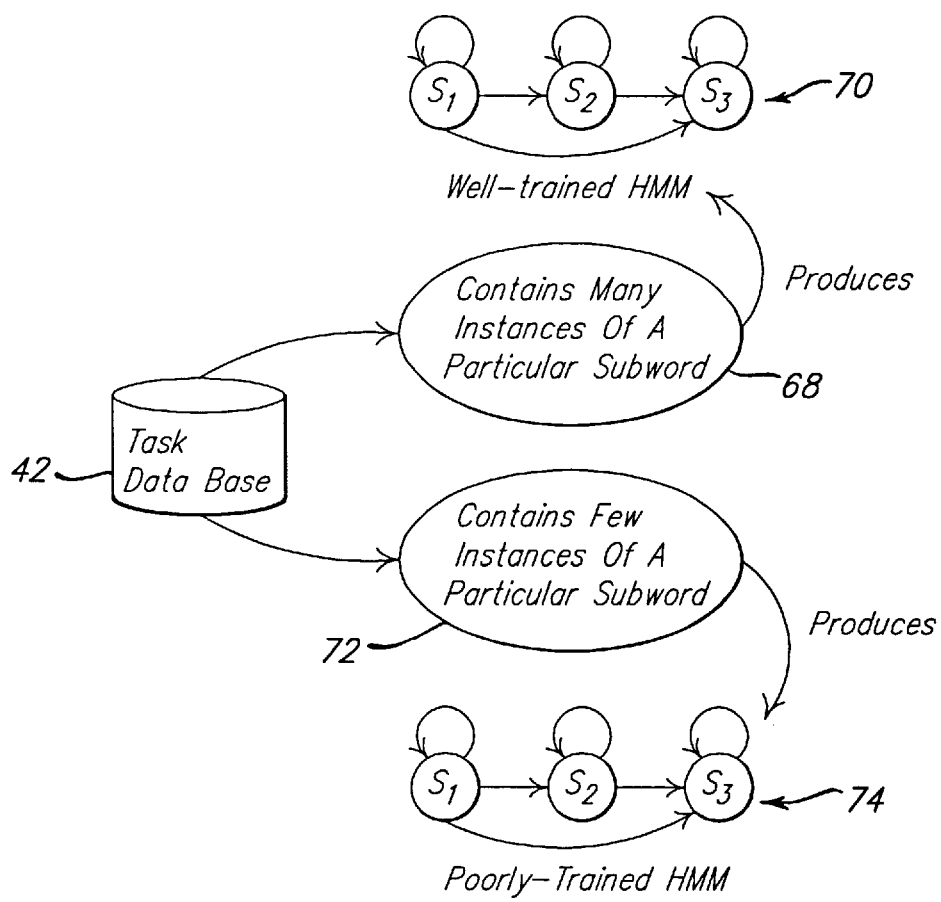
FIG. 5 is a data flow diagram comparing the well-trained and poorly-trained models.
Figure 5:
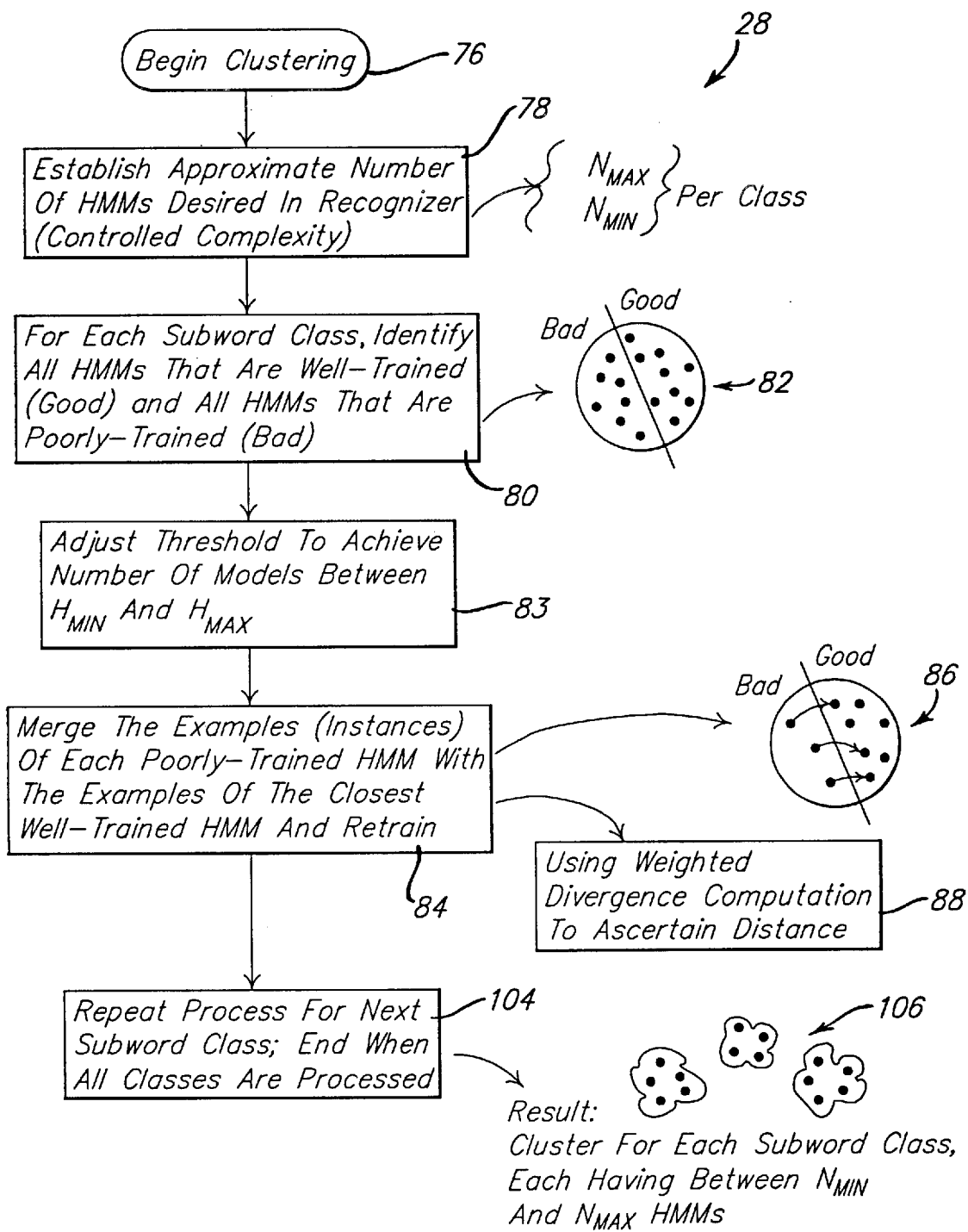

Unlike conventional statistical clustering techniques, the present invention treats well-trained models and poorly-trained models differently. This concept is illustrated in FIG. 5. In FIG. 5 the task database 42 can be expected to represent some subwords well and other subwords poorly, depending on how many speech examples of the particular subword occur in the task database. If, as illustrated at 68, a particular subword is represented many times in the task database, then a well-trained model 70 is produced. On the other hand, if a particular subword contains few examples in the database, as depicted at 72, a poorly trained model 74 is produced. The present invention populates or trains each model using the task database that was segmented and labeled in Step 12. For each phoneme model trained, a score is maintained to indicate the number of training instances or examples that were used to train that phoneme model. The invention is thus able to discriminate between good models and bad models based on the number of training instances. This may be accomplished by comparing with a predetermined threshold. In this way, the present invention produces a speech model comprising a controlled number of subword models that are each well trained.

The clustering Step 28 of the present invention is shown in detail in FIG. 6 beginning at 76, the first step is to establish the number of Hidden Markov Models that are desired in the recognizer. This is shown at Step 78. In the presently preferred embodiment the method directs or steers the clustering steps so that the size or complexity of the model is controlled to be between $N_{min}$ and $N_{max}$ models per class. The ability to dictate the size and thereby control the complexity prior to training while simultaneously controlling the quality of each cluster is an advantage. In conventional statistical clustering techniques the system designer has no way to readily control the quality of the models in each class, as the quality of the models is strictly dictated by the statistical distribution of the data and the number of training examples which the designer has no control over.

Figure 7:
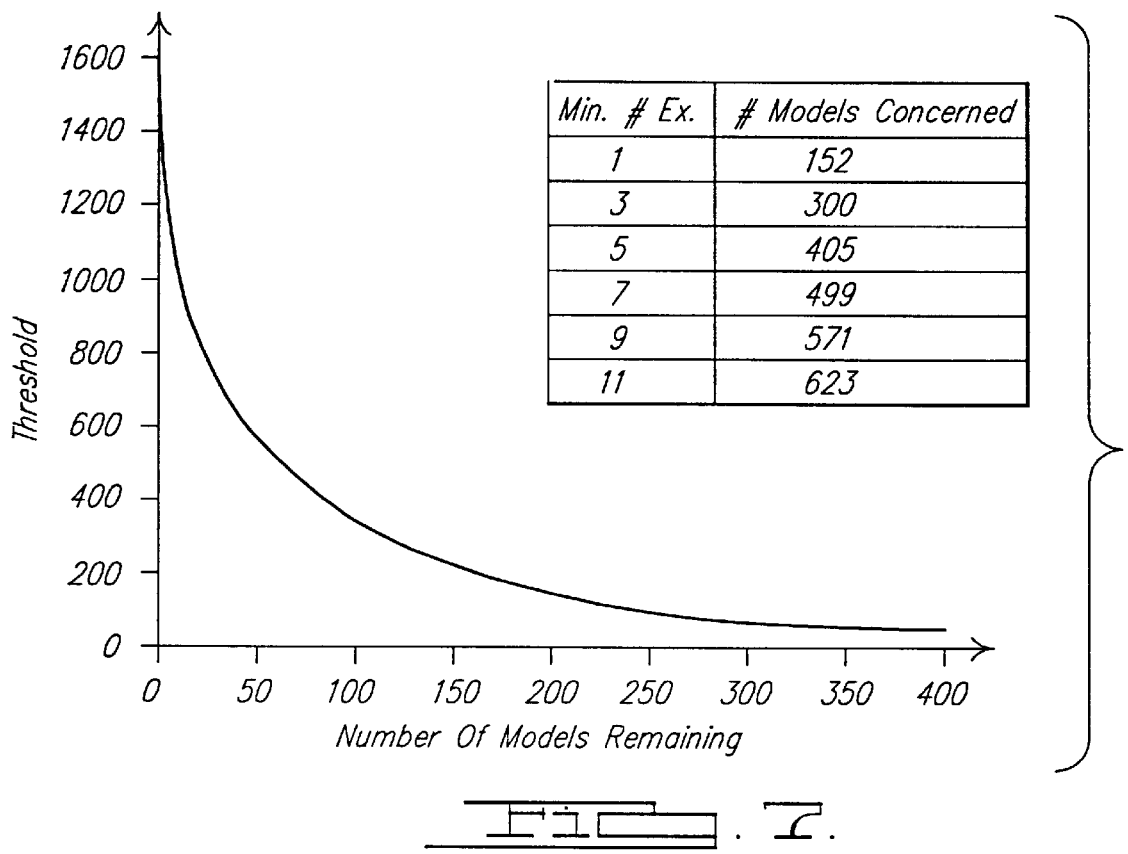
FIG. 7 is a graph showing an analysis of the left context-dependent distribution models.

FIG. 7 shows the relationship between the number of models remaining as a function of threshold on the TIMIT database. Note that as the number of examples per model increases the number of models corresponding to this number of examples also increases, as indicated by the table included in FIG. 7. The curve of FIG. 7 can be used to determine how to set the appropriate threshold to approximately achieve the number of models desired in the resultant speech model 40.

Proceeding with the clustering method, after the desired number of HMMs is established in Step 78, the method next identifies all HMMs that are well trained (good) and all HMMs that are poorly trained (bad). This is shown in Step 80 and diagrammatically depicted at 82. Depicted in the inset figure at 82 is a representation of all models (shown as individual dots) that are segregated into good and bad categories. The threshold is then adjusted for each class to be between $N_{min}$ and $N_{max}$. If $N_{min}$ cannot be achieved, all the examples are used to represent that class (Step 83). If the task database is large enough $N_{min}$ will usually be achieved.

Next, each of the poorly-trained models is merged with the closest well-trained model in Step 84. This procedure is diagrammatically illustrated at 86 and is performed by merging the examples or instances of each poorly-trained HMM with the examples of the closest well-trained HMM. This is done for all subword classes and then the models are retrained. The presently preferred embodiment uses a weighted divergence computation to ascertain distance. This is indicated at 88. The weighted divergence computation is performed according to equation 1 presented below. In the equation, two models $M_i$ and $M_j$ and a set of $N_C$ examples are described. For each model $M_i$ the subset of its training examples is represented by the list of indices $I_i$. $A_{ik}$ is the kth training occurence in Equation 1 $P<A_{i_k}|M_i>$ is the isolated emission probability of $A_{ik}$ by the model $M$ and N is its number of occurences. In Equation 1 note the weighting factor $1/N_i+N_j$ is applied to the divergence computation. The weighting factor has the effect of giving greater emphasis to models that are well trained, while giving less emphasis to models that are poorly trained. To compute the distance between all models in a class according to Equation 1 the technique described subsequently as "Summing Simplification" may be used.

$$d(M_i \leftrightarrow M_j) = \frac{1}{N_i + N_j} \left( \sum_k \log \left[ \frac{P<A_{i_k}|M_i>}{P<A_{i_k}|M_j>} \right] + \sum_k \log \left[ \frac{P<A_{i_k}|M_j>}{P<A_{i_k}|M_i>} \right] \right) \quad \text{Equation 1}$$

Finally, in Step 104 the process is repeated for the next subword class. The process ultimately ends when all classes are processed as described above. Then the models are retrained.

The result, illustrated diagrammatically at 106, is a plurality of clusters for each subword class, with each cluster having between $N_{min}$ and $N_{max}$ HMMs.

An alternate embodiment for performing the clustering step 28 is illustrated in FIG. 9. It is similar to the procedure illustrated in FIG. 6, except that the threshold adjusting step is not employed as at Step 83 of FIG. 6. Instead, after the poorly-trained clusters are merged with the closest well-trained ones in Step 84, the procedure performs a check at Step 90 to determine whether the current number of good HMMs is already lower than the specified maximum value $N_{max}$. If the number of models is already below the maximum, then control branches immediately to Step 104. At Step 104 the processing for the current subword is complete and the foregoing process is repeated (beginning at Step 76) for the next subword class. The procedure continues in this fashion until all of the subwords have been processed. When all have been processed the clustering procedure 28 ends.

Assuming the number of good HMMs is not below the maximum threshold at Step 90, then a further clustering procedure is performed to reduce the number of HMMs. At this point it will be understood that all of the HMMs represent well-trained models, the poorly-trained ones having been eliminated at Step 84. Although all models at Step 92 are good ones, there will still be some that are based on fewer training examples than others. By sorting the list of HMMs in order of the number of training examples, the HMM having the fewest examples may be readily identified as depicted at Step 92 and further graphically illustrated at 94. Next, in Step 96, as graphically depicted at 98, the HMM that was selected as having the fewest examples is then compared with each of the remaining HMMs, to determine which of its neighbors is the closest. Again, the weighted divergence computation is used (as indicated at 100) according to Equation 1 presented above. The HMM having fewest examples is then merged with its closest neighbor by merging its examples with that of the closest neighbor. In so doing, the number of good HMMs is reduced by 1.

Next, at Step 102, the number of good HMMs is compared with the maximum threshold value previously set as $N_{max}$. If the current number exceeds $N_{max}$, then the procedure branches back to Step 92 for further reduction of the size of the set. Each pass through the loop (Steps 92 and 96) reduces the number of models by one model.

Finally, when the number of good HMMs is below the maximum threshold $N_{max}$, control branches out of the loop to Step 104. As previously noted, the entire procedure beginning at Step 76 is repeated for each subword class, until all subword classes have been processed to eliminate the poorly-trained models and to consolidate the well-trained ones to achieve the desired size (desired complexity). Then the models are retrained. The result, diagrammatically illustrated at 106, is a plurality of clusters for each subword class, with each cluster having between $N_{min}$ and $N_{max}$ HMMs.

Figure 8:
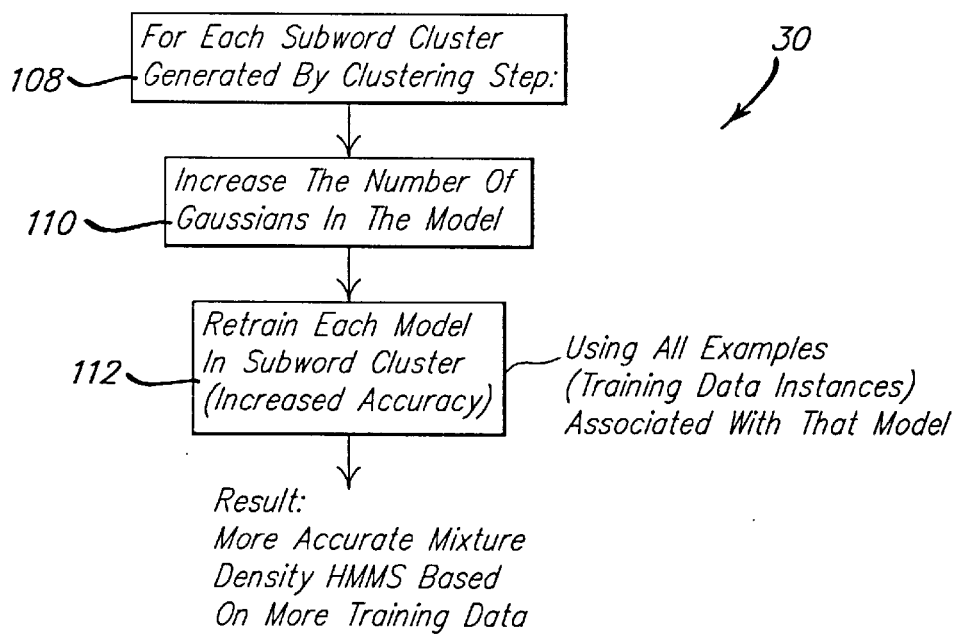
FIG. 8 is a flowchart illustrating the Accuracy Increasing step.

Regardless of whether the procedure outlined in FIG. 6 or the procedure outlined in FIG. 9 has been used, the model for each subword class is optimally trained (given the limited data that may be available) and constrained to a model size dictated in advance by the designer through selection of the $N_{min}$ and $N_{max}$ parameters. If desired, the model can simply be used at this point in a speech recognizer. However, if higher accuracy is desired, the number of Gaussian densities to represent each model may be increased, as shown in Step 30 (FIG. 1). FIG. 8 presents a more detailed explanation of Step 30 beginning at Step 104. For each subword HMM generated by Step 104 (FIG. 6) the number of Gaussian densities used in the model may be increased (Step 110). Then, each model is retrained (Step 112) to increase the model's accuracy. The retraining step uses all examples (all training data instances) associated with that model. The result is a more accurate mixture density model based on the additional training data.

Although increasing the number of mixture components may not be necessary in some implementations (depending on the accuracy required), the implications of this step are still quite important. Had the increased number of mixture components been used at the outset of the model building process, a great deal of storage space and processor energy would need to have been expended, possibly without benefit; and it may not be possible to train the models due to the inadequate number of examples. Increasing the number of mixture components used to represent a poorly trained model gives little benefit, as the higher accuracy of the mixture density model would be largely wasted on the poor training set. Moreover, without a meaningful way to reduce the number of clusters, the resulting mixture density models would be too large and cumbersome for efficient use by a speech recognizer. The impact of this would be felt each time the recognizer is used due to the large number of parameters needed to represent the speech model.

In contrast, the present invention efficiently reduces the size of the overall model, eliminating poorly trained models in the process, and increasing the instances of training data for those models that are retained. Thereafter, a higher number of mixture components can be used without unduly increasing the size of the overall speech model and a more robust model results, because the models are better trained.

While the invention has been illustrated and described in its presently preferred form, it will be understood that the invention is capable of certain modification without departing from the spirit of the invention as set forth in the appended claims.

SUMMING SIMPLIFICATIONS

Let's call $\{M_i\}$ the set of bad models and $\{M_j\}$ the set of good models. For each divergence measure $d(M_i \leftrightarrow M_j)$ we need the following emission probabilities:

$$\{\log P<A_{i_k}|M_i>\}_{i_k \in I_i}, \{\log P<A_{j_k}|M_j>\}_{j_k \in I_j} \text{ and } \{\log P<A_{j_k}|M_i>\}_{j_k \in I_j}.$$

Let's assume we have a total of N models and $N_t$ examples, of which P bad models with $N_{tb}$ examples and (N−P) good ones with $N_{tg}$ examples. Then we need: Nt+P*Ntg+(N−P)*Ntb emission probabilities to process the whole clustering. But we can only compute for each model $$M_i: A_i = \sum_k \log P<A_{i_k}|M_i>$$

and the matrix $$A_{ij} = \sum_k \log P<A_{i_k}|M_j>$$

(the same thing for $M_j$ with $B_j$ and $B_{ji}$). Then the divergence between two models can simply be written as:

$$d(M_i \leftrightarrow M_j) = \frac{1}{N_i + N_j} (A_i - A_{ij} + B_j - B_{ji}) \quad (7)$$

Therefore with the same assumptions, for N models, P bad ones and (N−P) good ones we need only: N+2*P*(N−P) emission probabilities to process the whole clustering.

What is claimed is:

1. A clustering method for processing speech training data to generate a set of low complexity statistical models for use in automated speech recognition, comprising:
   segmenting the training data into labeled subword units;
   generating Hidden Markov Models to represent said subword units,
   selecting a desired number of models to be between a predetermined minimum and a predetermined maximum by adjusting a threshold on the number of examples per model;
   training said models with said segmented training data to generate:
   (a) a first plurality of populated models based on instances of training data above a said threshold, and
   (b) a second plurality of populated models based on instances of training data below a said threshold;
   merging each model of said second plurality with the closest neighbor of the models of said first plurality to form a set of new models and retraining the new models.

2. The method of claim 1 wherein said Hidden Markov Models employ Gaussian functions to represent states within the models and wherein said method further comprises increasing the number of Gaussian functions per state after said merging step is performed.

3. The method of claim 1 wherein each model of said second plurality is merged with the closest one of the models of said first plurality using a weighted distance to select said closest neighbor of the models.

4. The method of claim 3 wherein each model of said first plurality has a corresponding first number of training instances and each model of said second plurality has a corresponding second number of training instances and wherein said weighted distance is inversely proportional to the sum of the respective numbers of training instances.

5. The method of claim 1 wherein said merging step is performed class by class such that for each class the number of new models is between said predefined upper and lower limits.

6. A clustering method for processing speech training data to generate a set of low complexity statistical models for use in automated speech recognition, comprising:
   segmenting the training data into labeled subword units, said subword units each being a member of one of a plurality of classes;
   generating Hidden Markov Models to represent said subword units, said models having a plurality of states including an intermediate state;
   tying said intermediate states of all models that represent subword units of the same class to define a plurality of state-tied models;
   selecting a desired number of models to be between a predetermined minimum and a predetermined maximum by adjusting a threshold on the number of examples per model;
   training said state-tied models with said segmented training data to generate:
   (a) a first plurality of populated models based on instances of training data above said predetermined threshold, and
   (b) a second plurality of populated models based on instances of training data below said predetermined threshold;
   merging each model of said second plurality with the closest neighbor of the models of said first plurality to form a set of new models and retraining the new models.

7. The method of claim 6 wherein said Hidden Markov Models employ Gaussian functions to represent states within the models and wherein said method further comprises increasing the number of Gaussian functions per state after said merging step is performed.

8. The method of claim 6 wherein each model of said second plurality is merged with the closest one of the models of said first plurality using a weighted distance to select said closest neighbor of the models.

9. The method of claim 8 wherein each model of said first plurality has a corresponding first number of training instances and each model of said second plurality has a corresponding second number of training instances and wherein said weighted distance is inversely proportional to the sum of the respective numbers of training instances.

10. The method of claim 6 wherein said merging step is performed class by class such that for each class the number of new models is between said predefined upper and lower limits.

* * * * *

UNITED STATES PATENT AND TRADEMARK OFFICE
CERTIFICATE OF CORRECTION

PATENT NO.    : 5,806,030
DATED         : September 8, 1998
INVENTOR(S)   : Jean-Claude Junqua It is certified that error appears in the above-identified patent and that said Letters Patent is hereby corrected as shown below:

<u>Title page,</u>
Item [73], Assignee, should be inserted to read as follows:

-- Matsushita Electric Industrial Co., Ltd. --

Signed and Sealed this

Twenty-fifth Day of June, 2002

Attest:

Attesting Officer

JAMES E. ROGAN
*Director of the United States Patent and Trademark Office*